United States Patent Office 3,054,747
Patented Sept. 18, 1962

3,054,747
METHOD OF SEPARATING NON-SURFACE ACTIVE IONIC MATERIALS FROM SOLUTION
Elmer L. Gaden, Jr., Brightwaters, N.Y., and Robert W. Schnepf, Elizabeth, N.J., assignors to Radiation Applications, Inc., Long Island City, N.Y., a corporation of New York
No Drawing. Filed July 22, 1960, Ser. No. 44,513
9 Claims. (Cl. 210—44)

This invention relates to a process of separating ions from liquid solutions by the technique referred to hereinafter as foam distillation or foam separation.

This application is a continuation-in-part application of our copending application, Serial No. 699,914, filed December 2, 1957 (now abandoned).

In the separation of homogeneous mixtures such as true solutions, which of course have only a single phase, there are a number of fundamental approaches which may be employed. The first basic approach involves the formation of a second phase whose equilibrium composition differs from that of the first phase. This second phase may be formed by the addition or removal of heat by such well known techniques as evaporation, sublimation, distillation or crystallization. The second phase may also be formed by the addition of another component to the system such as employed in techniques involving chemical precipitation, solvent extraction, nonselective adsorption, chromatographic adsorption or ion exchange. Another fundamental approach to the separation of homogeneous mixtures is by employing a barrier or membrane system. This barrier may either pass some components of the mixture and reject others or it may pass all components at different rates. Dialysis and osmosis are typical examples of this technique.

While the above procedures may be looked upon as the basic means of separation available to the chemical processing industry, these procedures are not entirely satisfactory, particularly when it is desired to remove trace quantities of impurities or contaminants from a system. For example in the field of radioactive materials, trace quantities of such materials may appear in waste streams in sufficient amounts to create a disposal problem. At the present time, in order to eliminate the radioactive contaminants it is necessary to reprocess or recycle the waste stream through the main operation. This method is costly by reason of the large plant capacity required for removal of a relatively small quantity of material. Similarly many industry reagents become contaminated with metallic impurities during process use and means of removing these trace impurities from the reagent would substantially extend the process life of the reagent.

It is therefore the primary object of this invention to provide a process for separating ionic materials from solutions or dispersions. It is another object of this invention to provide a process for removing trace amounts of ionic material from aqueous solutions or dispersions. Other objects and advantages of this invention will become apparent from the following description and explanation thereof.

In accordance with the present invention we have discovered a process for separating non-surface active ionic materials from solutions thereof which comprises combining a liquid medium containing a soluble ionic material which is not surface active with a foaming agent to produce a soluble surface active complex of the ionic material bonded to the foaming agent thereby forming a single liquid phase having a composition gradient such that the surface layer is relatively rich in said complex, and separating the relatively rich surface layer from the liquid medium.

For the purpose of this specification and the appended claims, the liquid medium is the generic designation for a true solution or a dispersion and is preferably an aqueous medium. Furthermore, the mechanism by which the foaming agent combines with the ionic material to form a complex includes coordination complex, chelation, substitution reaction, or any other technique through which the ionic material is bound or held to the foaming agent.

The product resulting from the combination of the non-surface active ionic material with the foaming agent must be a surface active product in order for it to concentrate at the surface of the liquid medium. While we do not wish to be bound by any theory as to the mechanism of our reaction, we believe that the addition of a foaming agent to the liquid containing the non-surface active ionic materials lowers the surface tension of the liquid and allows the resulting surface active complex to concentrate at the gas-liquid interface. The surface inactive ionic materials not combined with the foaming agents will concentrate in the interior of the solution rather than at the gas-liquid interface. This may come about because any liquid containing a surface active solute may be thought of as comprising two regions. The first is the "bulk solution" remote from any interface and virtually uniform in composition. The second is the "surface material," a thin layer adjacent to the interface which is richer in solute than the bulk solution. Thus a single phase homogeneous solution has a composition gradient between the solution and the surface region such that the surface region is richer in the solute than is the interior regions of the compositions.

Since the ionic material is attached or combined with the foaming agent and is concentrated at the surface region, it can be separated by skimming off a layer of liquid from the surface of the liquid medium, or as preferred in this invention, by passing a gaseous material through the liquid medium to cause foaming and then removing the foam in typical distillation fashion. The gaseous material can be any gas or vaporous material which is safe to handle. Additional criteria are that it be cheap, and otherwise will not react with the surface active complex to cause undue complications. The gaseous material can be steam, air, nitrogen, carbon dioxide, normally gaseous hydrocarbon, argon, helium, etc. A normally gaseous material is preferred because the separation is most economically conducted at ambient temperature level and it is easy to separate a gas from a liquid.

The foam separation technique used in the present invention bears a superficial resemblance to the froth flotation techniques widely used in mineral separations, however, the two techniques are distinctly different. Froth flotation is applied to a system containing at least three phases, two solid and one liquid for the purpose of separating one solid phase from the other and simultaneously concentrating it. Froth flotation depends upon creating a significant density difference between the two solid phases by promoting selective attachment of one of them to gas bubbles. To promote this attachment, chemical agents are added which modify the surface of one of the solid phases but not of the other. Foam separation, on the other hand, applies to a system having only a single liquid phase, i.e., a true solution or a stable colloidal dispersion. Because of the inherent chemical configuration of certain solution components, concentration differences are established in the single liquid phase whereby these components concentrate at gas-liquid interfaces, as pointed out previously. Foaming of such a mixture provides a convenient method for producing a relatively large area of gas liquid contact and of removing that portion of the liquid which contains the concentrated material. Thus in our process, foaming agents are added to non-surface active ionic materials so as to cause the formation of a surface active chemical complex which will concentrate at the gas-liquid surface and which can be removed in the foam.

The material to be separated may be anionic or cationic in nature. The only requirement is that the material be ionic in character and non-surface active. The principal application of our process will be to ions of metals in groups II, III, IV, V, VI or VIII of the periodic table, and these may be present in salts, such as the halides, nitrates, or the soluble sulphates, carbonates or the like. Presently in the field of radioactive materials, strontium is an important element which can be separated by this process. Like other alkaline earth metal ions, it may be present in the liquid medium as a halide, e.g., a chloride.

The ionic material may be present in the liquid medium in varied concentrations, and preferably below the saturation level. The most economical and efficient application of our process is to the separation of small quantities of ionic material, starting from a trace, e.g. about $10^{-5}$ molar and up to about 1% by weight based on the total liquid medium. Presently, conventional processes are very inferior economically to the present process in this range of ionic concentration. In the nuclear field, the ionic material is usually present in quantities ranging from about 50 to 200 p.p.m., and it is possible by the present invention to produce liquid medium containing about 0.1 p.p.m. or less.

Generally any foaming agent which will combine with the non-surface active ionic material to form a surface active complex may be employed. The foaming agents which combine with the non-surface active material are preferably surface active although it is not essential for them to be surface active and include such materials as proteins, peptized proteins, anionic or cationic detergents, or soaps, etc.

To illustrate further the types of foaming agents which are useful for the purpose of this invention such groups as the oil soluble or water soluble aromatic sulphonates or sodium or potassium; the aliphatic sulphonates of sodium or potassium containing 8 to 24 carbon atoms; the aliphatic sulphates of sodium or potassium containing 8 to 25 carbon atoms; the sodium or potassium salts of the alkyl substituted benzene ethoxylated sulphonic acids in which 1 to 10 ethoxy groups and 1 to 18 carbon atoms in the alkyl group are present; the aliphatic ethoxylated sodium or potassium sulphonates in which the aliphatic group contains 8 to 24 carbon atoms and the compound contains 1 to 4 ethoxy groups; the alkyl substituted quaternary ammonium salts; the hydrocarbon substituted alkylene polyamino carboxylic acids; the sodium or potassium salts of fatty acids containing 8 to 24 carbon atoms; etc., may be cited. The foaming agent is added to the liquid medium containing the ionic material in an amount which is at least sufficient to combine with all of the ionic material.

In order to provide a better understanding of this invention, reference will be had to the following specific examples.

*Example I*

1.5 grams per liter of Bacto-Tryptose (partially peptized protein) were added to an aqueous solution of strontium chloride containing $2.5 \times 10^{-5}$ molar strontium ion. The pH of the solution was adjusted to 11. Air under a pressure of 15 p.s.i.g. was then passed through the resultant solution at the rate of 100 cc./min. The foam thus produced contained 1.55 times as much strontium ion as the original solution.

*Example II*

0.7 gram per liter of sodium (o-hydroxy phenyl) butyl benzene sulphonate (known as Areskap) were added to an aqueous solution of strontium chloride containing $1 \times 10^{-3}$ molar strontium ion. The pH of the resultant solution was 10. Air under a pressure of 15 p.s.i.g. was passed through the solution at a rate of 100 cc./min. The foam produced contained a strontium ion concentration of 23.5 times that of the original solution.

*Example III*

The procedure was the same as that of Example II, except that the strontium solution had a strontium ion concentration of $2 \times 10^{-5}$ molar, resulting in a foam containing 12 times the strontium ion as the original solution.

*Example IV*

The procedure was the same as that of Example II, except that the strontium solution contained $1 \times 10^{-4}$ molar strontium ion and the foam was 4 times as concentrated in strontium ion as the original solution.

*Example V*

The procedure was the same as that of Example II, except that the combined solution had a pH of 7.7 and the foam had 20 times the strontium concentration as the original solution.

*Example VI*

The procedure was the same as that of Example II, except that the combined solution had a pH of 3.1, the strontium ion concentration of the aqueous strontium chloride solution was $1 \times 10^{-4}$ molar, and the foam contained 3.5 times as much strontium ion as the original solution.

*Example VII*

In this run, the surface active agent was sodium butyl benzene sulphonate, the aqueous solution of strontium chloride contained $4 \times 10^{-6}$ molar strontium ion, the combined solution had a pH of 7.7, otherwise the procedure was the same as Example II. The foam contained 22 times as much strontium ion as the original solution.

Examples II—IV show that as the concentration of the strontium ion concentration goes up, the effectiveness of foam separation goes down. Runs V and VI show that the effect of pH is negligible over a wide range. The aromatic sulphonates are excellent foaming agents as compared to proteinaceous material. Apparently the aromatic sulphonates not only combine effectively with the metal ion, but the resultant surface activity of the product is high.

In the next run a different metal ion was used.

*Example VIII*

The procedure in this run was the same as Example II, but an aqueous magnesium chloride solution containing $1.3 \times 10^{-4}$ molar magnesium ion was employed. The foam product contained 3.2 times as much magnesium as the original solution.

The above experiments demonstrate the effectiveness of our foam separation technique by the use of foaming agents. In an effort to determine whether well known chelating agents such as EDTA could be employed in our process, the following experiments were performed.

*Example IX*

Surface tension measurements were made for solutions of the ethylenediaminetetraacetic acid complex of calcium, ranging in concentration from 0 up to approximately $10^{-2}$ moles/liter of the complex. These measurements show no detectable change in surface tension with concentration. This experiment shows that solutions of the calcium-EDTA chelate are not surface active.

*Example X*

A radio tracer counting technique (using $Ca^{45}$) was used to determine the concentration of calcium at its solution interfaces. If the excess surface concentration is zero, no enrichment by foaming can be expected. The solutions employed had a concentration of $5\times10^{-5}$ M in Ca. The results of these experiments are presented below:

|  | Counts/minute |
|---|---|
| Blank—no EDTA | 1367 |
| $5\times10^{-5}$ M in EDTA | 1364 |

The difference in counting rate is within experimental accuracy. Therefore it can be concluded that the use of EDTA does not enrich calcium at the interfaces and therefore EDTA is ineffective for calcium enrichment by foaming.

Having thus provided a written description of our invention along with specific examples thereof, no undue limitations or restrictions are to be imposed by reason thereof, but that the present invention is defined by the appended claims.

We claim:

1. A process for the separation of non-surface active ionic materials from solution which comprises combining a liquid medium containing a soluble ionic material which is not surface active with a surface active foaming agent to produce a soluble surface active complex of the ionic material bonded to the foaming agent thereby forming a single liquid phase having a composition gradient such that the surface layer is relatively rich in the said product, and separating the relatively rich surface layer from the liquid medium.

2. The process of claim 1 wherein the foaming agent is an ionic sulphonate.

3. A process according to claim 1 which comprises separating relatively rich surface layers from the liquid medium by passing a gaseous material through the liquid medium and thereby causing the liquid medium to foam and separating the foam from the residual liquid medium.

4. A process for the separation of non-surface active ionic materials from solution which comprises combining an aqueous medium containing a soluble ionic material which is not surface active with a surface active foaming agent to produce a soluble surface active complex of the ionic material bonded to the foaming agent thereby forming a single liquid phase having composition gradients such that surface layers are relatively rich in the said product, passing a gaseous material through the aqueous medium and thereby causing it to foam, and separating the foam from the residual aqueous medium.

5. The process of claim 4 wherein the ionic material is present in an amount of about 0.00001% to 1% by weight.

6. The process of claim 4 wherein the foaming agent is a sulphonate of a metal selected from the group consisting of potassium and sodium.

7. The process for the separation of non-surface active ionic materials from solution which comprises combining an aqueous medium containing a soluble alkaline earth metal ion in an amount of about 50 to 200 p.p.m. with a foaming agent which is surface active to produce a soluble surface active complex of the foaming agent and the alkaline earth metal ion thereby forming a single liquid phase having composition gradients such that surface layers are relatively rich in said product, passing a gaseous material through the aqueous medium and thereby causing it to foam as a continuous stream from the main body of aqueous medium through a transfer zone and thereby effecting a separation of foam from the resilient aqueous medium.

8. The process of claim 7 wherein the sulphonate is sodium (O-hydroxyl phenyl) butyl benzene sulphonate.

9. The process of claim 7 wherein the sulphonate is sodium butyl benzene sulphonate.

References Cited in the file of this patent

UNITED STATES PATENTS 2,820,759 Monet _____ Jan. 21, 1958

OTHER REFERENCES

Gaudin: "Flotation," 2nd ed., Feb. 19, 1957, published by McGraw-Hill Book Co., N.Y., page 554 relied upon.

Dognon: Revue Scientifique, pages 613–619, vol. 79 (1941).